United States Patent [19]

Thurn et al.

[11] 3,887,602
[45] June 3, 1975

[54] PREPARATION OF NEW ORGANOSILANES

[75] Inventors: Friedrich Martin Thurn, Bruhl; Eugen Meyer-Simon, Frankfurt; Werner Will, Wolfgang; Franz Schmidt, Mannheim; Wolfgang Schenk, Schwetzingen; Rolf Wurmb, Heidelberg, all of Germany

[73] Assignee: Deutsche Gold- und Silber-Scheideanstalt vormals Roessler, Frankfurt, Germany

[22] Filed: Dec. 19, 1973

[21] Appl. No.: 426,028

[30] Foreign Application Priority Data
Dec. 22, 1972  Germany...................... 2262909

[52] U.S. Cl.................260/448.2 B; 260/448.8 R; 117/126 GS
[51] Int. Cl............................ C07f 7/08; C07f 7/18
[58] Field of Search ............... 260/448.8 R, 448.2 B

[56] References Cited
UNITED STATES PATENTS
3,218,344  11/1965  Bailey ......................... 260/448.8 R
3,410,820  11/1968  Harrod ..................... 260/448.2 B X

*Primary Examiner*—Paul F. Shaver

[57] ABSTRACT

The present discovery concerns new organosilanes which possess two silane groups, one of which is located at each end of a polymeric molecule. These compounds are useful in improving the physical properties of synthetic thermoplastic materials which are based on formaldehyde or trioxane and inorganic solids.

3 Claims, No Drawings

PREPARATION OF NEW ORGANOSILANES

BACKGROUND OF THE INVENTION

It is known that bifunctional organosilanes may be used as adhesive mediators to improve the adhesive affinity of organic polymers for solid inorganic substrates. One portion of the organosilane molecule is always a hydrolyzable silyl groups, and it is presumed that it or its hydrolysis product binds to the solid inorganic substrate. It is assumed that the coupling mechanism between the silicon functional part of the adhesive mediating molecule and the substrate involves condensation of silanol groups resulting from hydrolysis with surface silanol groups of glass fibers or other silicon materials to form a siloxane bridge. In the case of metals or other non-silicon substrates reaction may take place between the silanol groups and metal oxide groups or with a monomolecular water layer on the surface of the substrate.

The second function of an organosilane adhesive mediator is normally a reactive organo-functional group which can form a stable bond with the silicon atom, as for example a silicon-carbon bond. The organo-functional group of the adhesive mediator molecule should be capable of preferentially forming a chemical bond with functional groups of polymers, e.g., polyacetals. Polyacetals are materials that excell in mechanical properties. Nevertheless, a desire to further improve the rigidity and tensile strength of these materials has existed for a long time. Toward this end, glass fibers equipped with adhesive mediators based on organosilanes of the general formula $$(R'O)_3Si-R''$$

where R' represents lower alkyl and R'' represents vinyl-, methacryl-, oxypropyl-, aminopropyl- or glycidoxypropyl groups, have already been used. These adhesive mediators, which were originally developed for use with glass fibers and polymers that are capable of being hardened such as polyester and epoxy resins, had only modest effects in polyacetals. The tensile strength of glass fiber strengthened polyacetals prepared with the known organosilane adhesive mediators was improved only about 30 to 40% over that of glass fiber strengthened polyacetals without these adhesive mediators. In comparison, improvements of 200 to 250% could be obtained in the tensile strength of glass fiber strengthened unsaturated polyesters by use of these organosilane adhesive mediators. As a consequence, the above mentioned conventional adhesive mediators with organo-functional groups in the molecule are of litte or no use for glass fiber strengthened polyacetals. Attempts have already been made to improve the action of such adhesive mediators. In U.S. Pat. No. 3,455,867, a procedure is described by which the adhesive affinity between a polyoxymethylene and glass fibers is improved by crosslinking with isocyanates. Furthermore, from the British Pat. Specification No. 1,178,344, a procedure for the manufacture of glass fiber strengthened polyoxymethylenes is known in which the copolymerization of trioxane and small amounts of cyclic ethers or acetals is carried out in the presence of glass fibers coated with a silane or siloxane which contains an epoxide group.

SUMMARY OF THE INVENTION

The organosilanes of this invention are compounds of the general formula:

$$X_3Si-R-[(OCH_2)_n-O-R']_m-O-R-SiX_3 \quad (1)$$

wherein the X groups may be the same or different and X is selected from the group consisting of halogen, hydrocarbonoxy of one to seven carbon atoms, acyloxy of one to seven carbon atoms, and hydroxyl; the R groups may be the same or different and R is a straight chain or branched bivalent hydrocarbon fragment of two to 10 carbon atoms which is connected to the silicon atom by a silicon-carbon bond and may be interrupted one or more times by an oxygen atom; R' is an alkylene group of two to six carbon atoms which carbon atoms may contain, if necessary, one or two oxygen bridges; n is a number from 1.0 to 5.0; and m is a number from 10 to 200.

The six X ligands on both silicon atoms of the compounds of formula I can be the same or different. This also means that the three ligands on one silicon atom can be different, for example, one or two alkoxy groups in combination with two or one hydroxyl groups; one or two halogen atoms in combination with two or one hydroxyl groups or with two or one alkoxyl groups; one or two acyloxy groups in combination with two or one hydroxyl groups and so on. In the extreme case, all three X ligands on one silicon atom can all be different. In these examples, "symmetrical" ligands on the other silicon atom are possible or, regarding both silicon atoms in the molecule, a mixed or statistical distribution of the six ligands is also possible. A maximum of two ligands per silicon atom can also be replaced by other organic groups not yet mentioned such as lower alkyl groups of one to five carbon atoms or phenyl groups. The hydrocarbonoxy groups are preferred and within that group especially hydroxyl groups and lower alkoxy groups such as methoxy and ethoxy, again with the option of being the same or different. At least one X ligand per silicon atom must be a hydroxyl group or a hydrolyzable fragment and preferably all three should be such. By hydrolyzable fragments are usually meant fragments which will break off from the silicon atom upon reaction with water at room temperature.

The silicon containing polyformal derivatives of formula I are adhesive mediators which do not contain groups which are capable of reaction with functional groups of polymers by chemical bridge formation. Nevertheless, their action on polyacetals results in a hitherto unknown adhesion of surprisingly good quality between the organic polymer and solid materials, especially silicon materials and preferentially glass fibers. This excellent adhesion is manifested in the improved mechanical qualities of the resulting products.

DETAILED DESCRIPTION OF THE INVENTION

The following formulas (wherein the values for m in the general formula I are rounded off values) are typical examples of the organosilanes of the present invention:

$(H_3CO)_3Si-(CH_2)_3-[O-CH_2-O(CH_2)_2]_8-OCH_2-O-(CH_2)_3-Si(OCH_3)_3$ $(H_3CO)_3Si-(CH_2)_3-[O-CH_2-O-(CH_2)_2]_{16}-OCH_2-O-(CH_2)_3-Si(OCH_3)_3$ $(H_3CO)_3Si-(CH_2)_3-[O-CH_2-O-(CH_2)_2]_{27}-OCH_2-O-(CH_2)_3-Si(OCH_3)_3$

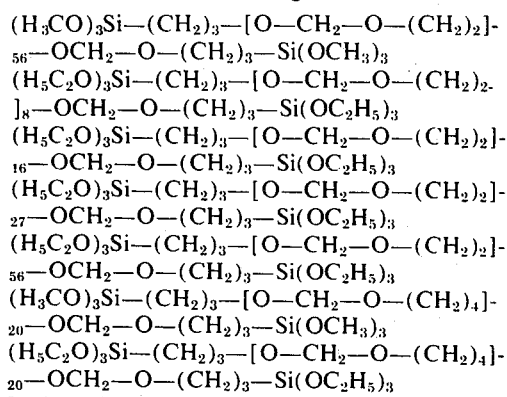

In these formulas, the —(CH$_2$)$_2$— units situated within the brackets may be statistically replaced by an arbitrary number of —(CH$_2$)$_4$— units.

The organosilanes of formula I can be synthesized by known procedures, as for example by addition of silanes, which contain hydrogen bonded to silicon, to polyformals with unsaturated end groups in the presence of platinum catalysts. The polyformals are accessible in turn by polymerization of cyclic formals, as for example 1,3-dioxolane or butanediolformal, in the presence of dialkenyl formals, as for example diallyl formal and if necessary in the presence of other cationically polymerizable compounds such as allylglycidyl ether. By these methods, a mixture of polyformals of varying degree of polymerization is formed. Therefore, the statement of degree of polymerization m is understood to be an average value.

The general reaction equation for the synthesis of organosilanes of formula I is as follows:

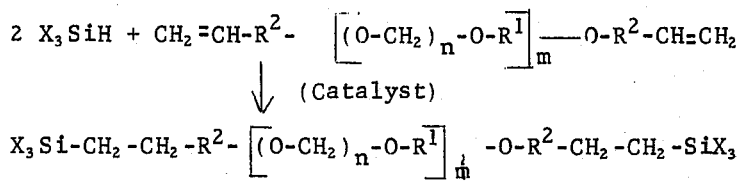

A preferred synthetic variant is the addition of trimethoxysilane to polyformals with allyl ether end groups according to the following equation:

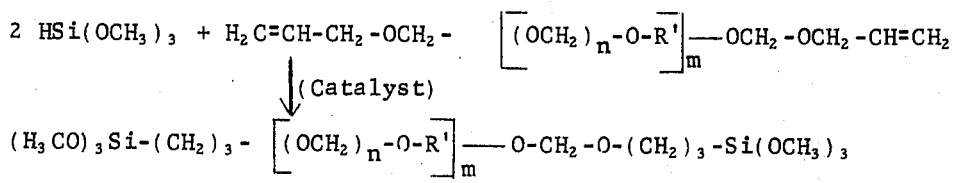

In these two equations X, R$^1$, n and m have the aforementioned meanings. R$^2$ is a straight chain or branched bivalent hydrocarbon fragment with one to eight carbon atoms which, if necessary, are interrupted one or more times by an oxygen atom, whereby the R$^2$ groups can be the same or different; or R$^2$ is just a simple chemical bond between the neighboring methylene group and the neighboring oxygen atom.

The preparation of compounds of formula I may be carried out by way of homogeneous as well as heterogeneous catalyses. For homogeneous catalysis, suitable catalysts, among others, are solutions of hexachloro platinum acid or dichloroplatinumacetylacetonate in organic solvents such as isopropanol, acetone and methanol. For preparation of compounds of formula I by heterogeneous catalysis, platinum on different absorbents such as activated charcoal, silicon dioxide, asbestos or γ-aluminum oxide is a suitable catalyst. Preferentially, the synthesis is carried out using platinum on activated charcoal as the catalyst. Compared to homogeneous catalysis, heterogeneous catalysis has the technical advantage of easy separation of the products from the catalyst, for example, by filtration.

The silanes of this invention may be incorporated with special advantage into thermoplastic compositions which consist of one or more polyacetals as well as one or more solid inorganic mineral or silicon material, preferably glass fibers or glass fiber products. These compositions, moreover, may contain known additives such as dyes, pigments, stabilizers, softeners, work-up aids or other organic polymers which favorably influence the properties of products made from the compositions.

A further object of the invention is the use of organosilanes of general formula I as adhesive mediators in the indicated thermoplastic compositions and/or thermoplastically workable materials or mixtures, whereby the new organosilanes improve the physical properties of the thermoplastic compositions.

Polyacetals, to which these new adhesive mediators are applicable with particular advantage, are preferably homo or copolymers of formaldehyde or trioxane. The homopolymers should contain thermally stable end groups, as for example ester or ether end groups. The copolymers should contain up to more than 50%, preferably up to more than 75% of oxymethylene groups based on the weight of copolymer and at least about 0.1% (based on the weight of copolymer) of groups of a comonomer that introduces at least two adjacent carbon atoms into the oxymethylene chain. Such copolymers may be prepared by a known method consisting of copolymerization of suitable comonomers, for example with cyclic ethers or acetals such as ethylene oxide, 1,3-dioxolane, 1,3-dioxane, 1,3-dioxacycloheptane, 1,3,5-trioxacycloheptane and 1,3,6-trioxacyclooctane or with linear oligo- or poly- formals or -acetals such as polydioxolane and polybutanediol formal. Other known copolymerizable compounds can be used by themselves or in mixtures, as well as molecular weight regulators and multi-functional branched comonomers. The polymers may contain stabilizers against heat and oxidation or even against light.

Solid inorganic materials which are especially suitable for use are silicon materials such as glass fibers; glass fiber structures such as glass fiber rovings, glass fiber mats, glass fiber fabrics, glass silk fabrics of different texture and density, glass silk cords, glass silk mats; and known products made of inorganic glass, which are suited for strengthening synthetic materials, such as glass foil, glass panes or plates, glass powder, highly dispersed silicic acids, silicates or clay. Glass fiber and glass silk structures are preferred. Examples of other solid materials that can also be used with success are metal oxides or metalloid oxides such as the already mentioned silicon dioxide, aluminum oxide and iron oxide or titanium oxide in powder or finely divided form. In addition, mixed oxides or oxide mixtures are also suitable.

The adhesive mediating compounds may be added directly in the preparation of the polymer and glass fiber mixture. It is especially advantageous, however, to coat the glass fibers with the organosilane adhesive mediator before they are mixed with synthetic polymer. A water finished glass fiber rope can be used for this purpose. In addition to the adhesive mediators, special film-forming polymeric substances can be attached to the glass fibers in order to protect the sensitive glass fiber surface from mechanical damage.

The new organosilane adhesive mediators are employed for normal applications in amounts of from 0.1 to 3 percent and preferentially in amounts of between 0.2 and 2.0 percent relative to the weight of the above mentioned inorganic materials such as glass fiber products. If the glass fibers or inorganic materials are coated with the adhesive mediators, a coating of 0.2 to 0.6 percent relative to the weight of the glass fibers or inorganic materials has generally proven to be appropriate. If the adhesive mediators are added together with granules of synthetic polymer during the mixing process, then 0.5 to 2.0 percent of adhesive mediators (based on the amount of glass fibers or inorganic materials) is especially appropriate.

The proportion of synthetic polymer, such as polyacetal, to glass fibers or other of the above mentioned inorganic materials can be varied in the mixture within wide limits. The mixture, for example, may contain between 10 and 50 percent of solid inorganic materials such as glass fibers with respect to the weight of the mixture. Especially favorable in this respect is a range of 25 to 35 weight percent.

In preparation of the mixtures, granules of synethetic polymer which have been mixed with the adhesive mediators may be mixed with suitable commercial glass fibers such as glass fiber rovings using suitable kneading devices and preferably using a doubly-undulated spiral extruder. It is also possible to mix polyacetals with glass fibers and particularly with endless glass silk strands which have been coated with the new organosilanes.

The following examples illustrate the invention.

EXAMPLE 1

To a one liter three-neck flask equipped with stirrer, reflux condenser, addition funnel and thermometer are added 500 g. of a polyformal with allyl ether end groups together with a commercial platinum on activated charcoal catalyst (containing 0.1 weight percent platinum) in the amount of 5 g. per mole of C—C double bond in the polyformal and heated up to 80° C under nitrogen with the exclusion of moisture. Over a period of 20 minutes, 1.5 moles of trialkoxy silane per mole of C—C double bond (50% excess) are then added dropwise. The resulting exothermic reaction is completed by heating at 120° C for 2 hours. After cooling, excess trialkoxy silane is removed by vacuum distillation and the reaction product is separated from the catalyst by a hot filtration. In the case of high viscosity starting material and end product, benzene is used as a diluent. The reaction products are highly viscous or crystalline colorless substances which are soluble in organic solvents and in water. It was established by nuclear resonance spectroscopy that the reaction follows the above cited general equations. Table 1 contains further examples (I to VI) of the preparation of the organosilanes together with analytical data.

The incorporation of previously treated reinforcing materials in polyacetal, for example, may be carried out by the usual procedures. For instance, the glass fibers or the glass fiber roving or such can be encased by a polymer melt. The encased roving is then cooled and can then be cut into granules. By another procedure, granules of synthetic material are mixed with the cut and already treated glass fibers or with other previously treated solid or filler materials and the mixture then heated above the melting point of the synthetic polymer. The melt, after being cooled, is then cut into smaller fragments. If the glass fibers are in the form of "rovings" the synthetic material is first plasticized in a kneading machine, then the treated glass fibers are fed into the melt down-stream, crushed in the machine and homogenously mixed in. After cooling, the mixture is granulated. If untreated glass fibers are used, the new adhesive mediators can be applied to the synthetic polymer granules while introducing the glass fibers, for example in a drum or similar device.

EXAMPLE 2

In a doubly-undulated spiral extruder of the ZSK type of the Werner and Pfleiderer Company was melted a copolymer of trioxane and 2% ethylene oxide. The melt index at 190° C and 2.16 kilograms load was 9. Downstream of the melting zone was an opening in the wall of the extruder through which endless glass fibers could be pulled in. These glass fibers were separately coated with the three different adhesive mediators indicated in Table 2. The melt containing the crushed glass fibers was squeezed through a nozzle, drawn off as a cord and granulated with an appropriate device. These articles were formed from these granules and the mechanical measurements given in Table 2 were made on these articles.

EXAMPLE 3

A polyformaldehyde with a melt index (at 190° C and 2.16 kilograms load) of 8 to 10 was melted together and mixed homogeneously in an extruder of similar construction (see Example 2) with glass fibers in the form of rovings, for which a commercial roving suited for reinforcing was used, and with one of the three adhesive mediators of Example 2. Following the extrusion and granulation of this mixture, test articles were prepared from it as described in Example 2 and the results given in Table 3 were measured on them.

TABLE I (PREPARATION OF EXAMPLES)

| EXAMPLE | POLYFORMAL USED | IODINE[r] NUMBER BEFORE THE REACTION | MOLECULAR WEIGHT AS DETERMINED FROM JZ | m (DETERMINED FROM JZ) | | SILANE USED IN REACTION | IODINE[r] NUMBER AFTER THE REACTION | Si-CONTENT OF PRODUCT IN % |
|---|---|---|---|---|---|---|---|---|
| I | a | 72 | 704 | 8,2 | 8 | d | 3,5 | 5,82 |
| II | a | 39 | 1300 | 16,25 | 16 | d | 4 | 3,60 |
| III | a | 24 | 2110 | 27,2 | 27 | e | 5 | 2,19 |
| IV | a | 12 | 4235 | 55,9 | 56 | e | 3 | 1,07 |
| V | b | 24 | 2110 | 19,7 | 20 | d | 2,5 | 2,35 |
| VI | c | 28 | 1810 | 9,7 | 10 | c | 4 | 2,70 | a: Polydioxolane  
b: Polybutadiol formal  
c: Mixed polymers of Dioxolane and Butanediol formal (1:1)  ) all with allyl ether end groups  
d: Trimethoxy silane  
e: Triethoxy silane  
[r]: Iodine Number, JZ See Rompp: Chemical Lexicon, 6th Edition, 1966, Volume II, Page 2039

TABLE II

Mechanical Data from Test Substances of the Copolymer (Example 2) that was Reinforced by Previously Treated Glass Fibers.
(The percentages are relative to the weight of the copolymer plus glass fibers.)

| AMOUNT OF COPOLYMER | AMOUNT OF GLASS FIBERS | ADHESIVE MEDIATOR | AMOUNT OF ADHESIVE MEDIATOR ADDED | TENSILE STRENGTH (in Kp/cm²) ACCORDING TO DIN 53 455 | IMPACT TENACITY (in cmkp/cm²) ACCORDING TO DIN 53,453 |
|---|---|---|---|---|---|
| 70% | 30% | None | — | 650 | 8.5 |
| 70% | 30% | Adhesive Mediator A: *(See formula at bottom of table) Molecular Weight About 1000 | 0.2% | 1,050 | 12.2 |
| 70% | 30% | Adhesive Mediator B: Same formula as adhesive mediator A, molecular weight about 2000, however | 0.4% | 1,125 | 13.2 |
| 65% | 35% | Adhesive Mediator C: See formula of adhesive mediator A, molecular weight of about 1,500, however | 0.3% | 1,086 | 11.8 |

\* $(CH_3O)_3Si-(CH_2)_3-[OCH_2-O-CH_2CH_2]_m-OCH_2-O(CH_2)_3-Si(OCH_3)_3$

TABLE III

Tensile Strength and Impact Tenacity of Test Substances from a Polyformaldehyde (Example 3).
Reinforcement with Glass Fibers During the Addition of Adhesive Mediators over Granules.
(The percentages are relative to the weight of polyformaldehyde plus glass fibers.)

| AMOUNT OF POLYFORMALDEHYDE | AMOUNT OF GLASS FIBERS | ADHESIVE MEDIATORS (SEE TABLE 2) AND AMOUNTS ADDED | TENSILE STRENGTH (in kp/cm²) ACCORDING TO DIN 53 455 | IMPACT TENACITY (in cmkp/cm²) ACCORDING TO DIN 53 453 |
|---|---|---|---|---|
| 70% | 30% | 0.5% A | 1,045 | 10.2 |
| 70% | 30% | 0.5% B | 1,130 | 12.4 |
| 70% | 30% | 0.5% C | 1,086 | 12.8 |
| 70% | 30% | — | 810 | 8.9 |

We claim:

1. Organosilanes of the formula

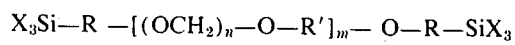

$$X_3Si-R-[(OCH_2)_n-O-R']_m-O-R-SiX_3 \quad (I)$$

wherein the X groups may be the same or different and X is selected from the group consisting of halogen, hydrocarbonoxy of one to seven carbon atoms, acyloxy of one to seven carbon atoms and hydroxyl; the R groups may be the same or different and R is a straight chain or branched bivalent hydrocarbon fragment of two to 10 carbon atoms which is connected to the silicon atom by a silicon-carbon bond and may be interrupted one or more times by an oxygen atom; R' is an alkylene group of two to six carbon atoms which may contain one or two oxygen bridges; n is a number from 1.0 to 5.0; and m is a number from about 10 to 200.

2. Organosilanes of formula I as set forth in claim 1 wherein one X group per silicon atom is selected from the group consisting of lower alkyl of one to five carbon atoms and phenyl.

3. Organosilanes of formula I as set forth in claim 1 wherein two X groups per silicon atom are selected from the group consisting of lower alkyl of one to five carbon atoms and phenyl.

* * * * *